United States Patent
Chavda

(10) Patent No.: US 7,562,065 B2
(45) Date of Patent: Jul. 14, 2009

(54) METHOD, SYSTEM AND PROGRAM PRODUCT FOR ESTIMATING TRANSACTION RESPONSE TIMES

(75) Inventor: Kavita Chavda, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 11/111,064

(22) Filed: Apr. 21, 2005

(65) Prior Publication Data

US 2006/0242103 A1  Oct. 26, 2006

(51) Int. Cl.
G06F 17/30 (2006.01)

(52) U.S. Cl. .......................... 707/1; 707/100; 709/233; 705/35

(58) Field of Classification Search ........................ None
See application file for complete search history.

(56) References Cited

U.S. PATENT DOCUMENTS

| | | | |
|---|---|---|---|
| 5,471,614 A * | 11/1995 | Kakimoto .................... 718/102 |
| 6,052,363 A | 4/2000 | Koch |
| 6,393,480 B1 | 5/2002 | Qin et al. |
| 6,662,223 B1 | 12/2003 | Zhang et al. |
| 6,704,409 B1 * | 3/2004 | Dilip et al. ............. 379/265.02 |
| 6,856,970 B1 * | 2/2005 | Campbell et al. ............. 705/35 |
| 2002/0080726 A1 | 6/2002 | Klassen et al. |
| 2002/0167942 A1 | 11/2002 | Fulton |
| 2003/0033404 A1 | 2/2003 | Richardson |
| 2004/0103193 A1 * | 5/2004 | Pandya et al. ............... 709/224 |
| 2004/0199646 A1 | 10/2004 | Susai et al. |
| 2005/0018611 A1 | 1/2005 | Chan et al. |

* cited by examiner

Primary Examiner—Khanh B Pham
Assistant Examiner—Andalib F Lodhi
(74) Attorney, Agent, or Firm—Anne Linne; Hoffman Warnick LLC

(57) ABSTRACT

Under the present invention, components of an enterprise architecture are first identified. This process not only involves hardware, software and topographic identification, but also includes developing and documenting an understanding of the business processes occurring within the enterprise architecture. Based on this analysis, an enterprise architecture profile is developed. Thereafter, transactions that occur within the enterprise architecture are identified, and data related thereto is collected for different geographic regions. In general, a transaction involves a set (e.g., one or more) of steps (e.g., "clicks") within an application of the enterprise architecture. For each such step, data is collected. Based on the data collection one or more transaction class profiles are developed. Using these profile(s) and the enterprise architecture profile, transaction response time(s) can be estimated.

9 Claims, 4 Drawing Sheets

| Business Scenario | Transaction Description | Transaction Number | Duration (sec.) | Bytes | App. Turns |
|---|---|---|---|---|---|
| Execute Query | Click on binoculars | 10001 | 1.67 | 5646 | 4 |
| | Click the find button | 10004 | 2.6 | 122976 | 56 |
| Query Search | Click the Opportunity Screen tab | 10101 | 4.21 | 112332 | 57 |
| | Click the Query button | 10102 | 0.27 | 10902 | 4 |
| | Click go | 10103 | 0.24 | 7324 | 2 |
| | Click alt-S | 10104 | 0.72 | 21308 | 18 |
| | Click OK | 10105 | 0.65 | 11348 | 8 |
| Create Act | Click the Opportunity Screen tab | 10201 | 0.48 | 15414 | 9 |
| | Click Queries drop down list | 10202 | 0.92 | 11890 | 5 |
| | Select an Opportunity | 10204 | 0.22 | 10020 | 10 |
| | Select the Activities View tab | 10205 | 2.53 | 49961 | 33 |
| | From the activities view tab, click new | 10206 | 0.36 | 5501 | 4 |
| | Click the Activity Type Picklist | 10207 | 0.28 | 4886 | 4 |
| | Select activity type | 10208 | 0 | 56 | 1 |
| | Click the Priority Picklist | 10209 | 0.5 | 5254 | 4 |
| | ctrl-S to save the record | 10211 | 2.74 | 26670 | 16 |
| Find Contact | Click the binoculars from any screens | 10301 | 0.2 | 6267 | 5 |
| | Click the "Look in" drop down menu | 10302 | 0.15 | 5171 | 3 |
| | Select Contacts | 10303 | 8.8 | 112276 | 59 |
| | Click Find | 10304 | 8.8 | 112276 | 59 |

FIG. 2

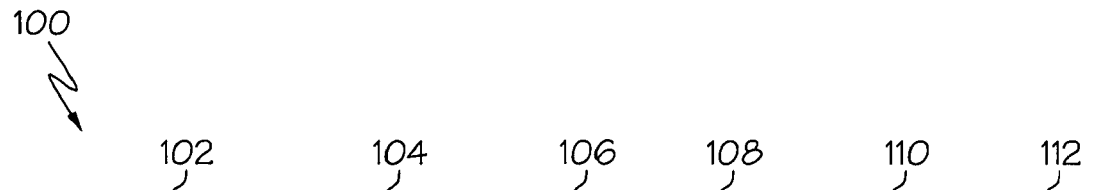

| Step 1: Navigate to Accounts screen | Scenarios Name | Baseline Time | Network Propagation | Data Transmission | Tota Time |
|---|---|---|---|---|---|
| | Measured: 10.215 sec | 10.215 | 0 | 0 | 10.215 |
| | Brussels<>Portsmouth | 10.215 | 0.13754 | 0.00583 | 10.35837 |
| | Greenock<>Portsmouth | 10.215 | 0.038 | 0.00583 | 10.25883 |
| | Helsinki<>Portsmouth | 10.215 | 0.34728 | 0.00583 | 10.56811 |
| | Johannesburg<>Portsmouth | 10.215 | 0.96549 | 0.00583 | 11.18632 |
| | Lisbon<> Portsmouth | 10.215 | 0.14195 | 0.00583 | 10.36278 |
| | Rome<> Portsmouth | 10.215 | 0.10442 | 0.00583 | 10.32525 |
| | Minneapolis/St. Paul<>Southbury | 10.215 | 0.24131 | 0.00583 | 10.46214 |
| | Raleigh<>Southbury | 10.215 | 0.07351 | 0.00583 | 10.29434 |
| | China <>Yamato | 10.215 | 0.09117 | 0.00583 | 10.312 |
| | Brazil <>Southbury | 10.215 | 0.09117 | 0.00583 | 10.312 |
| | Japan <>Yamato | 10.215 | 0.14858 | 0.00583 | 10.36941 |
| | Australia <>Yamato | 10.215 | 0.06468 | 0.00583 | 10.28551 |
| | Toronto <>Southbury | 10.215 | 0.3 | 0.50569 | 11.02069 |
| | 56Kbps Modem User | 10.215 | 0.12 | 0.26 | 10.595 |
| | 256Kbps Broadband User | 10.215 | 0.12 | 0.05739 | 10.39239 |
| | Current Settings: 1Mbps Broadband User | 10.215 | 0.12293 | 0.00939 | 10.34733 |

FIG. 3

METHOD, SYSTEM AND PROGRAM PRODUCT FOR ESTIMATING TRANSACTION RESPONSE TIMES

FIELD OF THE INVENTION

In general, the present invention relates to a method, system and program product for estimating transaction response times. Specifically, the present invention provides a way to estimate response times for application transactions occurring in a network environment such as within an enterprise architecture.

BACKGROUND OF THE INVENTION

Under current day information technology (IT), applications are often deployed in a network environment. For example, an organization might have an enterprise architecture in which applications are deployed for use by tens of thousands of users. Such applications might go through numerous phases and/or releases. In many cases, these applications run into performance challenges such as stability issues, bottlenecks, etc.

An important part of resolving such issues is to understand and quantify the nature of transactions occurring throughout the enterprise architecture. Unfortunately, no existing system provides a way to accurately perform such a task. That, is no existing system has even considered how to define performance characteristics from a client-server nature within the enterprise architecture. Moreover, no existing system has realized that such performance challenges can vary among geographic regions. Still yet, no existing system has attempted to comprehend the underlying business processes when resolving such performance characteristics.

In view of the foregoing, there exists a need for a method, system and program product for profiling an application within an enterprise architecture. Specifically, a need exists for a method, system and program product for estimating transaction response times.

SUMMARY OF THE INVENTION

In general, the present invention provides a method, system and program product for profiling an application within an enterprise architecture. Specifically, the present invention provides for a method, system and program product for estimating transaction response time(s). Under the present invention, components of an enterprise architecture are first identified. This process not only involves hardware, software and topographic identification, but also includes developing and documenting an understanding of the business processes occurring within the enterprise architecture. Based on this analysis, an enterprise architecture profile is developed. Thereafter, transactions that occur within the enterprise architecture are identified, and data related thereto is collected for different geographic regions. In general, a transaction involves a set (e.g., one or more) of steps (e.g., "clicks") within an application of the enterprise architecture. For each such step, data is collected. Based on the data collection one or more transaction class profiles are developed. Using these profile(s) and the enterprise architecture profile, transaction response time(s) can be estimated.

A first aspect of the present invention provides a method for estimating a transaction response time, comprising: identifying components of an enterprise architecture; developing an enterprise architecture profile based on the identified components; collecting data based upon a set of transactions for different geographic regions within the enterprise architecture; developing at least one transaction class profile based upon the data; and estimating the transaction response time based upon the enterprise architecture profile and the at least one transaction class profile.

A second aspect of the present invention provides a system for estimating a transaction response time, comprising: a system for identifying components of an enterprise architecture; a system for developing an enterprise architecture profile based on the identified components; a system for collecting data based upon a set of transactions for different geographic regions within the enterprise architecture; a system for developing at least one transaction class profile based upon the data; and a system for estimating the transaction response time based upon the enterprise architecture profile and the at least one transaction class profile.

A third aspect of the present invention provides a program product stored on a computer readable medium for estimating a transaction response time, the computer readable medium comprising program code for performing the following steps: identifying components of an enterprise architecture; developing an enterprise architecture profile based on the identified components; collecting data based upon a set of transactions for different geographic regions within the enterprise architecture; developing at least one transaction class profile based upon the data; and estimating the transaction response time based upon the enterprise architecture profile and the at least one transaction class profile.

A fourth aspect of the present invention provides a method for deploying an application for estimating a transaction response time, comprising: deploying a computer infrastructure being operable to: identify components of an enterprise architecture; develop an enterprise architecture profile based on the identified components; collect data based upon a set of transactions for different geographic regions within the enterprise architecture; develop at least one transaction class profile based upon the data; and estimate the transaction response time based upon the enterprise architecture profile and the at least one transaction class profile.

A fifth aspect of the present invention provides computer software embodied in a propagated signal for estimating a transaction response time, the computer software comprising instructions for causing a computer system to perform the following functions: identify components of an enterprise architecture; develop an enterprise architecture profile based on the identified components; collect data based upon a set of transactions for different geographic regions within the enterprise architecture; develop at least one transaction class profile based upon the data; and estimate the transaction response time based upon the enterprise architecture profile and the at least one transaction class profile.

A sixth aspect of the present invention provides a business method for estimating a transaction response time.

Therefore, the present invention provides a method, system and program product for estimating a transaction response time.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 2 depicts an illustrative transaction class profile according to the present invention.

FIG. 3 depicts an illustrative report containing estimated transaction response times according to the present invention.

It is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

For convenience purposes, the Best Mode for Carrying Out the Invention will have the following sections:
I. General Description
II. Enterprise Architecture Profiling
III. Transaction Class Profiling
IV. Estimation of Transaction Response Time(s)

I. General Description

As indicated above, the present invention provides a method, system and program product for profiling an application within an enterprise architecture. Specifically, the present invention provides for a method, system and program product for estimating transaction response time(s). Under the present invention, components of an enterprise architecture are first identified. This process not only involves hardware, software and topographic identification, but also includes developing and documenting an understanding of the business processes occurring within the enterprise architecture. Based on this analysis, an enterprise architecture profile is developed. Thereafter, transactions that occur within the enterprise architecture are identified, and data related thereto is collected for different geographic regions. In general, a transaction involves a set (e.g., one or more) of steps (e.g., "clicks") within an application of the enterprise architecture. For each such step, data is collected. Based on the data collection one or more transaction class profiles are developed. Using these profile(s) and the enterprise architecture profile, transaction response time(s) can be estimated.

Figure 1:
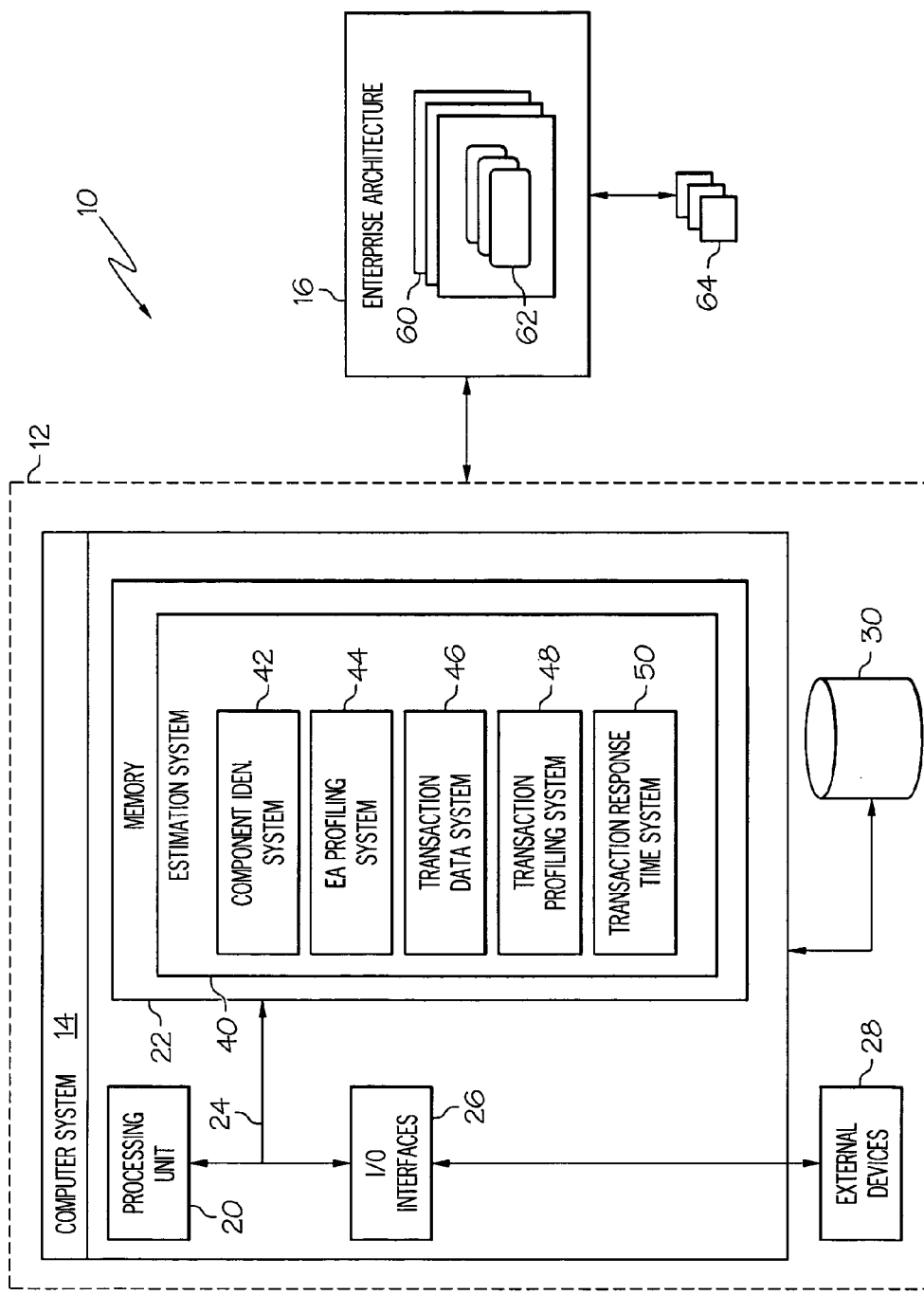
FIG. 1 depicts an illustrative system for estimating a transaction response time.

Referring now to FIG. 1, a system 10 for estimating transaction response time(s) for an enterprise architecture 16 is shown. As depicted, system 10 includes a computer infrastructure 12 including a computer system 14 that communicates with enterprise architecture 16. Enterprise architecture 16 generally includes various hardware 60 (e.g., clients, servers, routers, databases etc.) and software 62 (e.g. applications, operating systems, etc.) elements. To this extent, enterprise architecture 16 is typically implemented in a network environment over multiple geographic areas. Computer system 14 is shown within an infrastructure 12 that is separate from enterprise architecture 16 to illustrate that the present invention could be carried out by a party who is independent of enterprise architecture 16, such as a service provider or the like. However, it should be understood that computer system 14 could be deployed within enterprise architecture 16 (e.g., by a service provider or by an owner/operator of enterprise architecture 16) and still perform the functions of the present invention.

In any event, for the embodiment shown in FIG. 1, computer system 14 can communicate with enterprise architecture 16 (or the components thereof) over a network (e.g., the Internet, a wide area network (WAN), a local area network (LAN), a virtual private network (VPN), etc. In such a case, communication between computer system 14 and enterprise architecture 16 can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

Computer system 14 is shown including a processing unit 20, a memory 22, a bus 24, and an input/output (I/O) interfaces 26. Further, computer system 14 is shown in communication with external I/O devices/resources 28 and storage system 30. In general, processing unit 20 executes computer program code, such as estimation system 40, which is stored in memory 22 and/or storage system 30. While executing computer program code, processing unit 20 can read and/or write data, to/from memory 22, storage system 30, and/or I/O interfaces 26. Bus 24 provides a communication link between each of the components in computer system 14. External devices 28 can comprise any devices (e.g., keyboard, pointing device, display, etc.) that enable a user to interact with computer system 14 and/or any devices (e.g., network card, modem, etc.) that enable computer system 14 to communicate with one or more other computing devices, such as enterprise architecture 16.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14. Moreover, although not shown for brevity purposes, enterprise architecture 16 will likely contain computerized components similar to computer system 14.

Shown in memory 22 of computer system 14 is estimation system 40. In general, estimation system 40 will estimate transaction response times for transactions occurring within enterprise architecture 16. As shown, estimation system 40 includes component identification system 42, enterprise architecture profiling system 44, transaction data system 46, transaction profiling system 48 and transaction response time system 50. In general, estimation system 40 will take the following approach to estimate transaction response times:

(1) Develop a good understanding of traffic patterns of application 62 including the impact of network latency and acceptable response times as determined by users 64.

(2) Identify categories of users 64 based on characteristics such as type access, quantity, geographic region, etc.

(3) Identify appropriate connectivity strategies for each category of user 64 in each region based o their requirements and traffic volumes.

(4) Identify strategy for deploying application back-end components based on client traffic patterns and other requirements.

(5) Identify bandwidth requirements for the global core network to support transactions required by applications 62 and meet end users' 64 expectations or corporate response time standards. Typical factors in gauging bandwidth requirements include: identification and measurement of a typical usage pattern; understanding the types of user 64 (e.g., sales, management, etc.) and who is invoking which functions and the size of attachments; understanding the frequency of transactions; user concurrency from each site that would concurrently use the application; and response time service level requirements.

II. Enterprise Architecture Profiling

When attempting to estimate a transaction response time for enterprise architecture 16, component identification system 42 will first identify the components thereof. Identification of components under the present invention goes beyond identification of hardware 60 and software 62 elements. It also includes developing an understanding of any business processes occurring within enterprise architecture 16 through the use of applications 62. That is, users 64 will conduct a set (e.g., one or more) of transactions by taking certain actions/ steps (e.g., "clicks") within applications 62. As will be shown below, such steps and transactions are identified and understood by the present invention to accurately gauge response times. To this extent, component identification system 42 can be programmed to analyze enterprise architecture 16 to make such identifications. In addition, component identification system 42 can be programmed to receive data corresponding to the components of enterprise architecture 16 such as data manually input (e.g., by an administrator). To this extent, component identification system 42 should be understood to provide any needed interface pages so that all pertinent data can be collected and components identified.

In a typical embodiment, component identification system 42 will gather certain pieces of information about enterprise architecture 16 itself. For example, component identification system 42 will gather information about: hardware 60 and software 62 present in enterprise architecture 16; global wide area network details of enterprise architecture 16, including topology, technologies and latencies experienced between global sites and data centers; response times Service Level Agreements and Service Level Objectives; features and functions of enterprise architecture 16; and client strategy and ownership standards. In addition, as indicated above, component identification system 42 will be used to identify/document any business processes occurring within enterprise architecture 16. In general, this involves developing a list of any transactions associated with any business processes for various roles/responsibilities of users 64. In documenting the business processes of enterprise architecture, component identification system 42 could be programmed to monitor user 64 interactions with applications. In addition, component identification system 42 could be programmed to "parse" each application to determine the possible steps that could be taken by a user 64. Still yet, as mentioned above, component identification system 42 could provide one or more interface pages into which data for the business processes could be input (e.g., by an administrator or the like). Regardless of the implementation, an understanding of the business processes carried out using enterprise architecture 16 can be developed and documented.

After the components of enterprise architecture have been identified in this manner, enterprise architecture profiling system 44 will develop an enterprise architecture profile based thereon. The profile can take any type of format now known or later developed. For example, the enterprise architecture profile can include a graphical architectural diagram depicting the hardware and software components as well as any interconnections therebetween. Moreover, such a profile can depict or "trace" the transactions that can occur between the components. Alternatively, the enterprise architecture profile could have a tabular format that includes all of the information discussed above.

III. Transaction Class Profiling

In any event, once the components of enterprise architecture 16 have been identified and profiled, transaction data system 46 will collect data for each identified transaction and step/click. In performing this task, transaction data system 46 can ensure (or request) that any prerequisites are met. Under a typical embodiment of the present invention, prerequisites can include the following: transaction data is collected in a LAN environment; transaction data collection occurs between web clients and web servers, and between application servers and databases of enterprise architecture 16; any load-balancing present in enterprise architecture 16 is taken offline; network switch ports are mirrored for clients and web servers; and any servers in enterprise architecture 16 not related to the transaction testing are taken offline.

Transaction data collection under the present invention can involve several distinct elements. For example, transaction data system 46 can execute each transaction, and for each transaction and/or underlying step/click, determine the resources required such as: bytes transmitted and received; application turns, TCP turns, time to perform each transaction and/or turn; and delays/latency time (transaction, network propagation, Protocol, etc.). To determine this data, transaction data system 46 could trace a set of business scenarios that a user would normally execute on a workday and monitor the interactions to determine the needed information such as the total bytes sent and received, average bps/user (bandwidth requirement), etc. In addition, transaction data system 46 will typically collect such data for different geographic regions within enterprise architecture 16. One issue not addressed by previous systems is the difference in transaction data for different geographic regions. For example, it could be the case that one geographic region has a latency that another geographic region does not. To this extent, a transaction between geographic regions A and B could yield a completely different transaction response time than would a transaction between geographic regions A and C. Still yet, transaction data system 46 can collect transaction data based on the types of users executing the transactions, their usage patterns as well as data on the transactions themselves. Along these lines, the transaction data could also include a size of each step or turn, a size of any attachments, a frequency of transactions, steps/clicks and/or turns (e.g., how many times in an hour a transaction is executed), etc.

Once all pertinent transaction data has been collected, transaction profiling system 48 will develop at least one transaction class profile based upon the data. In a typical embodiment the transaction class profile developed details a business scenario, a set of steps, a transaction number, a transaction duration, a bandwidth requirement and a number of application turns for the each of the set of transactions. Referring to FIG. 2, an illustrative transaction class profile 70 is depicted. Four different transactions 72A-D are shown. Each transaction 72A-D is accompanied by a business scenario/class 74, a transaction description 76, a transaction number 78, a duration 80, a number of bytes 82 and a number of application turns 84. Furthermore, each transaction 72A-D can include one or more steps/clicks. For example, transaction 72A includes the steps 76 of "click on binoculars," and "click the find button."

IV. Estimation of Transaction Response Time(s)

Referring back to FIG. 1, after transaction profile 70 (FIG. 2) has been developed, transaction response time system 50 will estimate a transaction response time for each transaction based upon the enterprise architecture profile and transaction class profile. Specifically, the transaction response times are typically based on geographic regions, and involve a baseline time, a network propagation time and a data transmission time. When summed, these times generally represent the entire estimated transaction response time. Transaction response time system 50 will then generate a report containing these times by geographic region.

Referring to FIG. 3, an illustrative report 100 is shown. In general, report 100 will show each step/click in each transaction and its corresponding times. The example shown in FIG. 3 is for a "navigate to accounts screen" step of a transaction, as noted under column 102. As can be seen, times for this step are shown for different geographic regions under column 104. Baseline times, network propagation times, data transmission times and total times are shown under columns 106, 108, 110 and 112, respectively. In viewing report 100, it can be seen that for the step of "navigating to accounts screen," between Brussels and Portsmouth, the baseline time was 10.215 seconds (the baseline time was the same for all regions for this step), the network propagation time was 0.13754 seconds, and the data transmission time was 0.00583 seconds. These values yielded a total estimated transaction response time of 10.35837 seconds.

Figure 4:
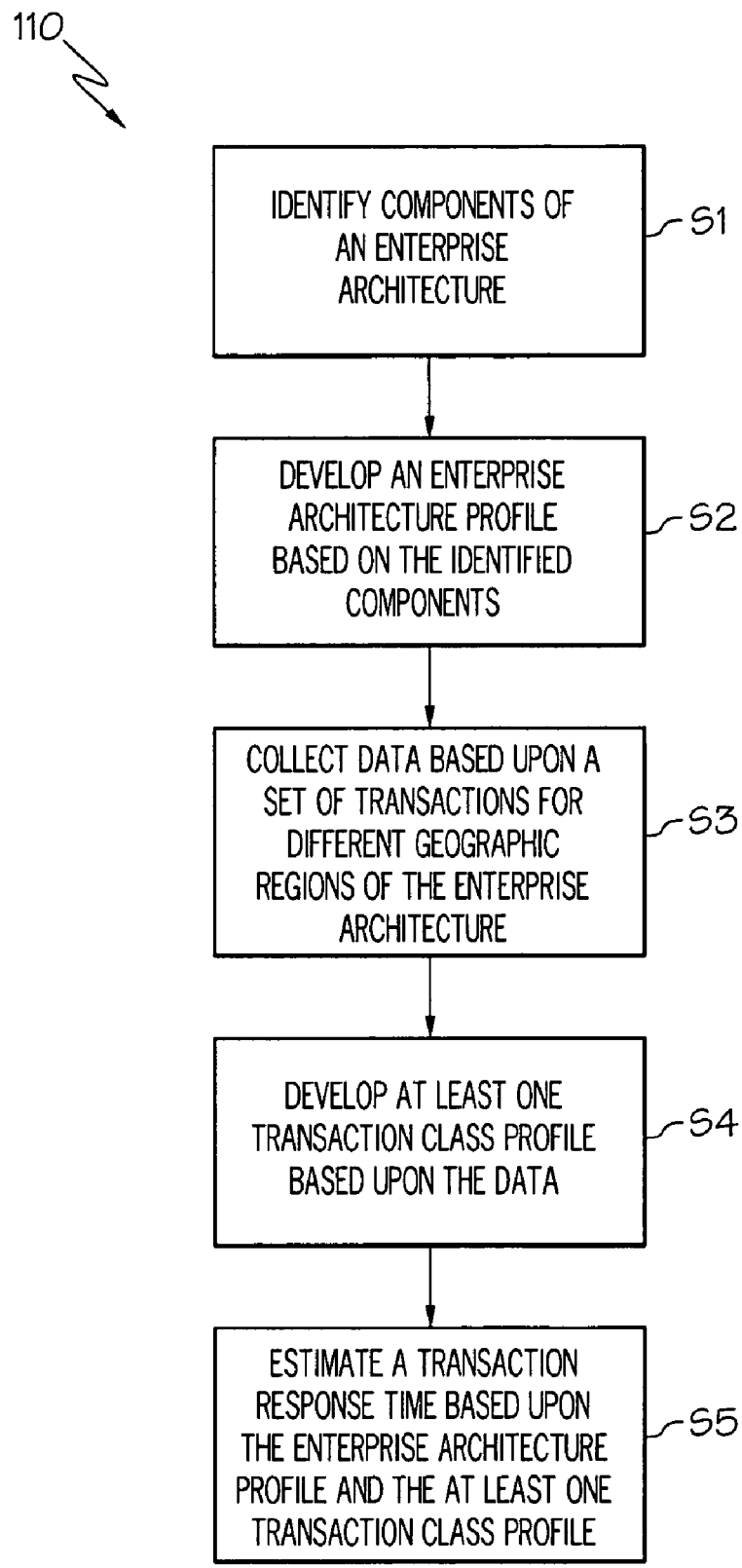
FIG. 4 depicts a method flow diagram of the present invention.

Referring now to FIG. 4, an illustrative method flow diagram 110 is shown. As shown, first step S1 of method 100 is to identify components of an enterprise architecture. Second step S2 is to develop an enterprise architecture profile based on the identified components. Third step S3 is to collect data based upon a set of transactions for different geographic regions within the enterprise architecture. Fourth step S4 is to develop at least one transaction class profile based upon the data. Fifth step S5 is to estimate a transaction response time based upon the enterprise architecture profile and the at least one transaction class profile.

While shown and described herein as a method and system for estimating a transaction response time, it is understood that the invention further provides various alternative embodiments. For example, in one embodiment, the invention provides a computer-readable medium that includes computer program code to enable a computer infrastructure to a estimate transaction response time. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer estimate a transaction response time. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method for estimating a transaction response time. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

I claim:

1. A method for estimating a transaction response time, comprising:

deploying a computer infrastructure to perform the following:

identifying components of an enterprise architecture, wherein the identifying comprises identifying hardware and software elements of the enterprise architecture, the identifying of hardware and software elements of the enterprise architecture comprising gathering information that includes information relating to the hardware and software elements present in the enterprise architecture, global wide area network details of the enterprise architecture including topology, technologies and latencies experienced between global sites and data centers present in the enterprise architecture, response times specified in Service Level Agreements and Service Level Objectives specified for the enterprise architecture, features and functions of the enterprise architecture, and strategies and ownership standards specified by users of the enterprise architecture; and documenting any business processes occurring within the enterprise architecture, the documenting of business processes occurring within the enterprise architecture including developing a list of transactions associated with business processes utilized for roles and responsibilities of the users in the enterprise, the developing of a list of transactions associated with business processes includes monitoring user interactions with applications run in the enterprise architecture, parsing applications to determine possible steps taken by users and providing one or more interface pages into which data for the business processes could be input by an administrator;

developing an enterprise architecture profile based on the identified components, the developing of the enterprise architecture profile including, generating a graphical architectural diagram depicting the hardware and software elements present in the enterprise architecture and interconnections thereof and the transactions occurring between the hardware and software elements;

collecting data based upon a set of transactions for different geographic regions within the enterprise architecture, wherein the collecting comprises collecting resources required for carrying out the set of transactions, wherein each set of transactions comprises a set of steps in an application of the enterprise architecture, wherein the collecting further comprises collecting data for each of the set of steps, wherein a load-balancing function of the enterprise architecture, and any servers of the enterprise architecture that are not related to the set of transactions, are taken offline for the collecting step;

developing at least one transaction class profile based upon the data, wherein the at least one transaction class profile details a business scenario, a set of steps, a transaction number, a duration, a bandwidth requirement and a number of application turns for the each of the set of transactions;

estimating the transaction response time based upon the enterprise architecture profile and the at least one transaction class profile, the estimated transaction response time including a baseline time, a network propagation time and a data transmission time; and generating a report that includes the transaction response time, wherein the transaction response time is arranged in the report based upon a corresponding geographic region.

2. The method of claim 1, wherein the collecting step occurs in a local area network environment.

3. The method of claim 1, wherein the collecting step occurs between clients, servers and databases of the enterprise architecture.

4. The method of claim 1, further comprising calculating a bandwidth requirement for each of the set of transactions.

5. A computer system for estimating a transaction response time, comprising:

at least one processing unit;

memory operably associated with the at least one processing unit; and an estimation system storable in memory and executable by the at least one processing unit, the estimation system comprising:

a system for identifying components of an enterprise architecture, wherein the system for identifying the components identifies hardware and software elements of the enterprise architecture, the system for identifying the components including a system for gathering information that includes information relating to the hardware and software elements present in the enterprise architecture, global wide area network details of the enterprise architecture including topology, technologies and latencies experienced between global sites and data centers present in the enterprise architecture, response times specified in Service Level Agreements and Service Level Objectives specified for the enterprise architecture, features and functions of the enterprise architecture, and strategies and ownership standards specified by users of the enterprise architecture and documenting any business processes occurring within the enterprise architecture, the documenting of business processes occurring within the enterprise architecture including developing a list of transactions associated with business processes utilized for roles and responsibilities of the users in the enterprise, the developing of a list of transactions associated with business processes includes monitoring user interactions with applications run in the enterprise architecture, parsing applications to determine possible steps taken by users and providing one or more interface pages into which data for the business processes could be input by an administrator;

a system for developing an enterprise architecture profile based on the identified components, the system for developing the enterprise architecture profile including a system for generating a graphical architectural diagram depicting the hardware and software elements present in the enterprise architecture and interconnections thereof and the transactions occurring between the hardware and software elements;

a system for collecting data based upon a set of transactions for different geographic regions within the enterprise architecture, wherein the system for collecting collects resources required for the set of transactions, wherein each of the set of transactions comprises a set of steps in an application of the enterprise architecture, and wherein the system for collecting collects data for each of the set of steps, and wherein the system for collecting performs a load-balancing function of the enterprise architecture, and any servers of the enterprise architecture that are not related to the set of transactions, are taken offline for the collecting of data;

a system for developing at least one transaction class profile based upon the data, wherein the at least one transaction class profile details a business scenario, a set of steps, a transaction number, a duration, a bandwidth requirement and a number of application turns for the each of the set of transactions;

a system for estimating the transaction response time based upon the enterprise architecture profile and the at least one transaction class profile, the estimated transaction response time including a baseline time, a network propagation time and a data transmission time; and a system for generating a report that includes the transaction response time, wherein the transaction response time is arranged in the report base upon a corresponding geographic region.

6. The system of claim 5, wherein the system for collecting calculates a bandwidth requirement for each of the set of transactions.

7. A program product stored on a computer readable medium containing computer instructions, which when executed, enables a computer system to estimate a transaction response time, the computer instructions comprising:

identifying components of an enterprise architecture, wherein the identifying comprises identifying hardware and software elements of the enterprise architecture, the identifying of hardware and software elements of the enterprise architecture comprising gathering information that includes information relating to the hardware and software elements present in the enterprise architecture, global wide area network details of the enterprise architecture including topology, technologies and latencies experienced between global sites and data centers present in the enterprise architecture, response times specified in Service Level Agreements and Service Level Objectives specified for the enterprise architecture, features and functions of the enterprise architecture, and strategies and ownership standards specified by users of the enterprise architecture; and documenting any business processes occurring within the enterprise architecture, the documenting of business processes occurring within the enterprise architecture including developing a list of transactions associated with business processes utilized for roles and responsibilities of the users in the enterprise, the developing of a list of transactions associated with business processes includes monitoring user interactions with applications run in the enterprise architecture, parsing applications to determine possible steps taken by users and providing one or more interface pages into which data for the business processes could be input by an administrator;

developing an enterprise architecture profile based on the identified components, the developing of the enterprise architecture profile including generating a graphical architectural diagram depicting the hardware and software elements present in the enterprise architecture and interconnections thereof and the transactions occurring between the hardware and software elements;

collecting data based upon a set of transactions for different geographic regions within the enterprise architecture, wherein the collecting comprises collecting resources required for carrying out the set of transactions, wherein each set of transactions comprises a set of steps in an application of the enterprise architecture, wherein the collecting further comprises collecting data for each of the set of steps, wherein a load-balancing function of the enterprise architecture, and any servers of the enterprise architecture that are not related to the set of transactions, are taken offline for the collecting step;

developing at least one transaction class profile based upon the data, wherein the at least one transaction class profile details a business scenario, a set of steps, a transaction number, a duration, a bandwidth requirement and a number of application turns for the each of the set of transactions;

estimating the transaction response time based upon the enterprise architecture profile and the at least one transaction class profile, the estimated transaction response time including a baseline time, a network propagation time and a data transmission time; and generating a report that includes the transaction response time, wherein the transaction response time is arranged in the report based upon a corresponding geographic region.

8. The program product of claim 7, wherein the collecting step comprises collecting a bandwidth requirement for each of the set of transactions.

9. A method for deploying an application for estimating a transaction response time, comprising:

deploying a computer infrastructure to perform the following:

identifying components of an enterprise architecture, wherein the identifying comprises identifying hardware and software elements of the enterprise architecture, the identifying of hardware and software elements of the enterprise architecture comprising gathering information that includes information relating to the hardware and software elements present in the enterprise architecture, global wide area network details of the enterprise architecture including topology technologies and latencies experienced between global sites and data centers present in the enterprise architecture, response times specified in Service Level Agreements and Service Level Objectives specified for the enterprise architecture, features and functions of the enterprise architecture, and strategies and ownership standards specified by users of the enterprise architecture; and documenting any business processes occurring within the enterprise architecture, the documenting of business processes occurring within the enterprise architecture including developing a list of transactions associated with business processes utilized for roles and responsibilities of the users in the enterprise, the developing of a list of transactions associated with business processes includes monitoring user interactions with applications run in the enterprise architecture, parsing applications to determine possible steps taken by users and providing one or more interface pages into which data for the business processes could be input by an administrator;

developing an enterprise architecture profile based on the identified components, the developing of the enterprise architecture profile including generating a graphical architectural diagram depicting the hardware and software elements present in the enterprise architecture and interconnections thereof and the transactions occurring between the hardware and software elements;

collecting data based upon a set of transactions for different geographic regions within the enterprise architecture, wherein the collecting comprises collecting resources required for carrying out the set of transactions, wherein each set of transactions comprises a set of steps in an application of the enterprise architecture, wherein the collecting further comprises collecting data for each of the set of steps, wherein a load-balancing function of the enterprise architecture, and any servers of the enterprise architecture that are not related to the set of transactions, are taken offline for the collecting step;

developing at least one transaction class profile based upon the data, wherein the at least one transaction class profile details a business scenario, a set of steps, a transaction number, a duration, a bandwidth requirement and a number of application turns for the each of the set of transactions;

estimating the transaction response time based upon the enterprise architecture profile and the at least one transaction class profile, the estimated transaction response time including a baseline time, a network propagation time and a data transmission time; and generating a report that includes the transaction response time, wherein the transaction response time is arranged in the report based upon a corresponding geographic region.

* * * * *